(12) United States Patent
Han et al.

(10) Patent No.: US 11,838,777 B2
(45) Date of Patent: Dec. 5, 2023

(54) SUPPORT FOR QUALITY-OF-SERVICE (QOS) MONITORING IN A DUAL CONNECTIVITY OR SPLIT NG-RAN WITH CONTROL PLANE (CP)—USER PLANE (UP) SEPARATION

(71) Applicant: Intel Corporation, Santa Clara, CA (US)

(72) Inventors: Jaemin Han, Portland, OR (US); Alexander Sirotkin, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 17/173,541

(22) Filed: Feb. 11, 2021

(65) Prior Publication Data

US 2021/0168637 A1 Jun. 3, 2021

Related U.S. Application Data

(60) Provisional application No. 62/977,051, filed on Feb. 14, 2020.

(51) Int. Cl.
*H04W 24/08* (2009.01)
*H04W 76/15* (2018.01)
*H04L 1/00* (2006.01)
*H04W 72/542* (2023.01)

(52) U.S. Cl.
CPC .......... *H04W 24/08* (2013.01); *H04L 1/0009* (2013.01); *H04W 72/542* (2023.01); *H04W 76/15* (2018.02)

(58) Field of Classification Search
None
See application file for complete search history.

(56) References Cited

U.S. PATENT DOCUMENTS

| | | | |
|---|---|---|---|
| 2019/0075552 A1* | 3/2019 | Yu | H04W 24/10 |
| 2020/0359244 A1* | 11/2020 | Yao | H04W 24/10 |
| 2021/0243652 A1* | 8/2021 | Yao | H04W 48/18 |
| 2021/0367683 A1* | 11/2021 | Hu | H04B 17/104 |
| 2022/0030454 A1* | 1/2022 | Wang | H04W 24/10 |
| 2022/0338032 A1* | 10/2022 | Hu | H04W 24/04 |

FOREIGN PATENT DOCUMENTS

| | | | | |
|---|---|---|---|---|
| EP | 3952402 A1 * | 2/2022 | ........... | H04B 17/364 |
| WO | WO-2019193154 A1 * | 10/2019 | | |

* cited by examiner

*Primary Examiner* — Anh Vu H Ly
(74) *Attorney, Agent, or Firm* — Schwegman Lundberg & Woessner, P.A.

(57) ABSTRACT

An apparatus for a Next Generation Node-B (gNB) includes processing circuitry coupled to memory. To configure the gNB for QoS monitoring in an NG-RAN with a control plane (CP)-user plane (UP) separation, the processing circuitry is to decode assistance information data received at a gNB Central Unit (gNB-CU) node of the gNB from a gNB Distributed Unit (gNB-DU) node of the gNB. The gNB-CU node is hosting an NR PDCP. The gNB-DU node is configured as a corresponding node of the gNB. The assistance information data includes delay information of a communication link of the NG-RAN measured by the corresponding node. A delay associated with the communication link is determined at the gNB-CU node of the gNB, based on the delay information measured by the corresponding node.

22 Claims, 5 Drawing Sheets

SUPPORT FOR QUALITY-OF-SERVICE (QOS) MONITORING IN A DUAL CONNECTIVITY OR SPLIT NG-RAN WITH CONTROL PLANE (CP)—USER PLANE (UP) SEPARATION

PRIORITY CLAIM

This application claims the benefit of priority under 35 U.S.C. 119(e) to U.S. Provisional Patent Application Ser. No. 62/977,051, filed Feb. 14, 2020, and entitled "SUPPORT FOR QOS MONITORING IN A DUAL CONNECTIVITY OR SPLIT NG-RAN ARCHITECTURE WITH CP-UP SEPARATION." This provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks such as 5G NR unlicensed spectrum (NR-U) networks. Other aspects are directed to systems and methods for supporting quality of service (QOS) monitoring in dual connectivity or split NG radio access network (RAN) architecture with control plane (CP)—user plane (UP) separation.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed, as well as unlicensed spectrum, is expected in future releases and 5G systems. Such enhanced operations can include techniques for supporting QOS monitoring in dual connectivity or split NG RAN architecture with CP-UP separation.

BRIEF DESCRIPTION OF THE FIGURES

In the figures, which are not necessarily drawn to scale, like numerals may describe similar components indifferent views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
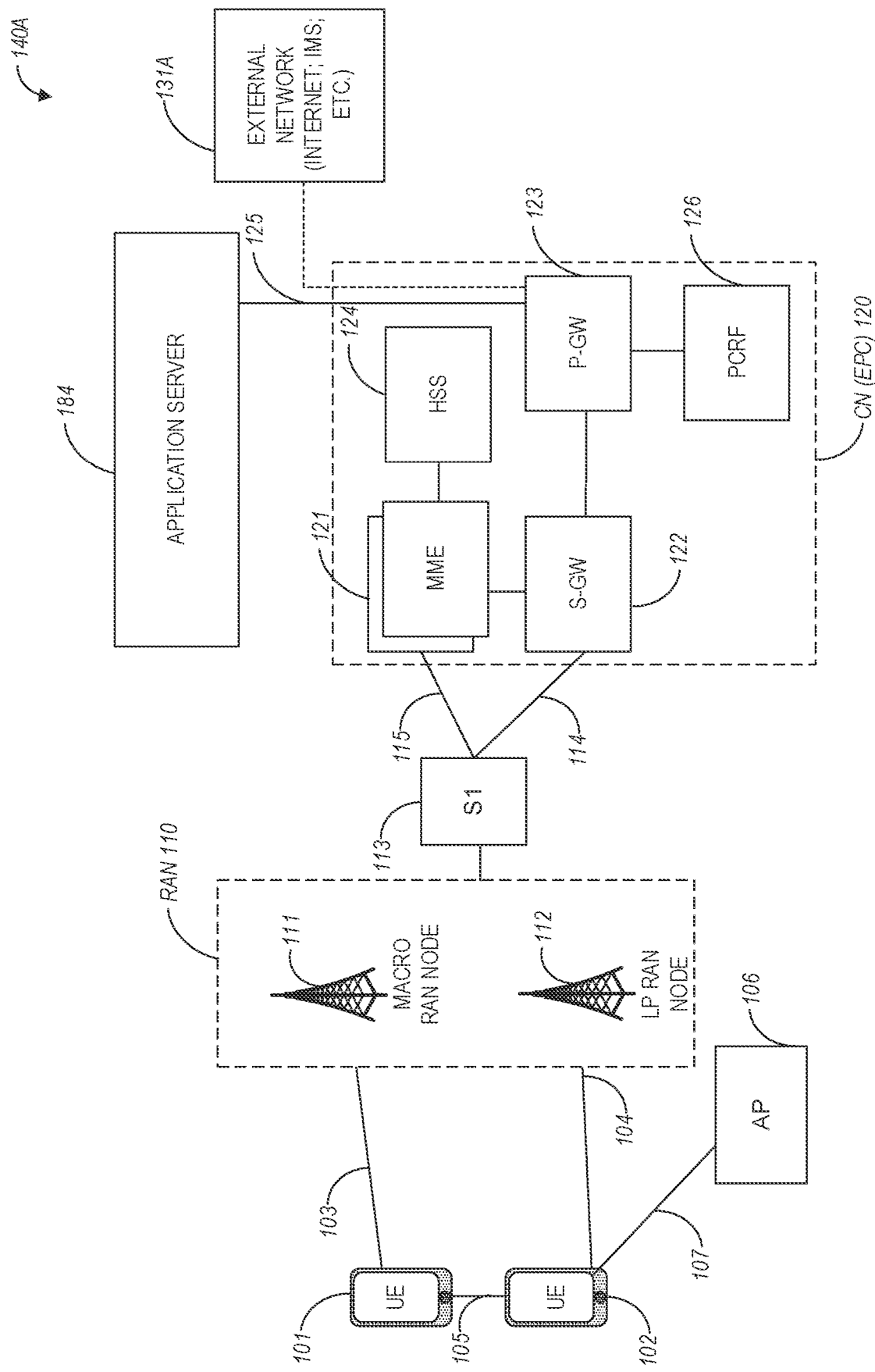
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to cam communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
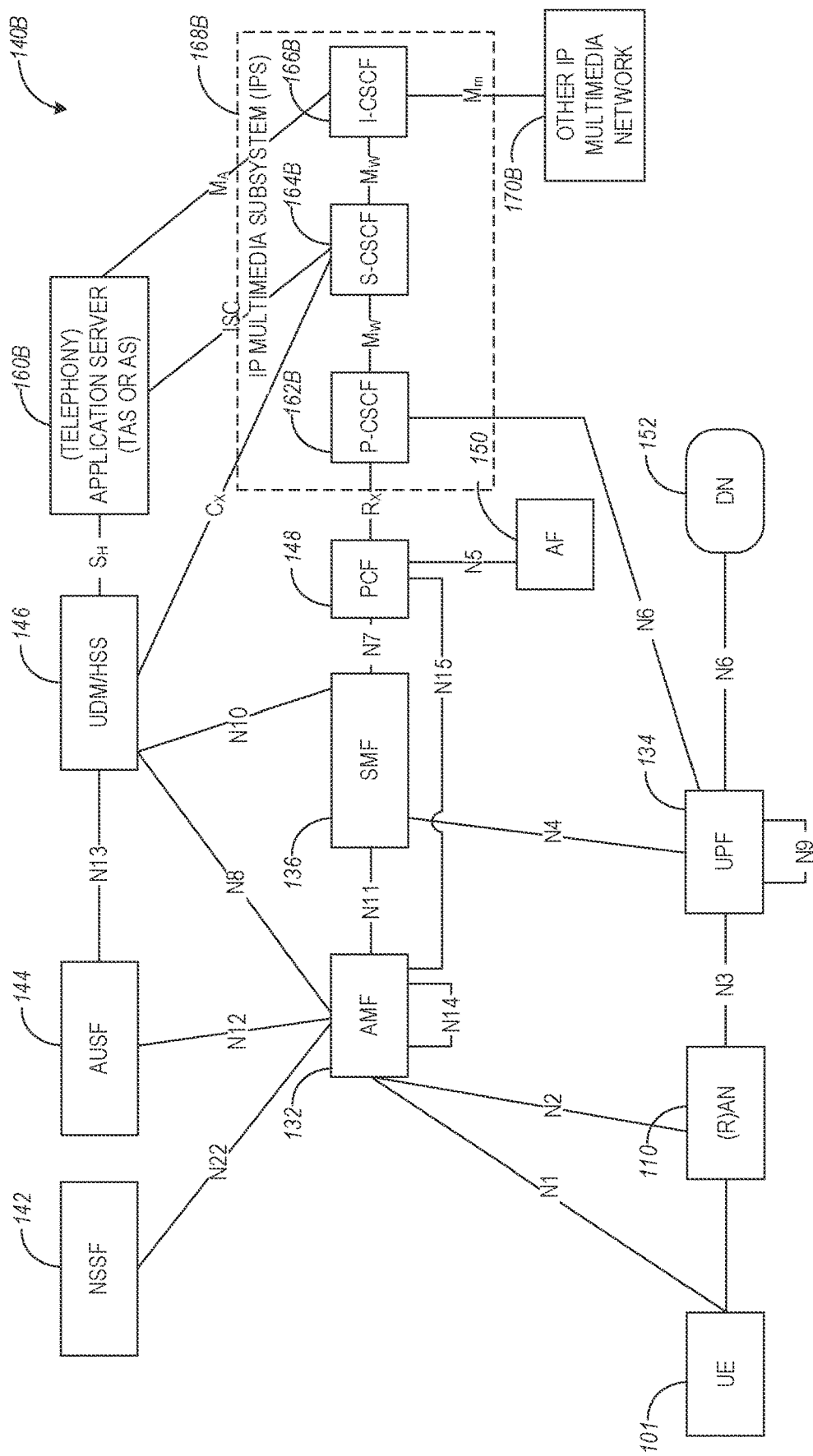
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152). N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
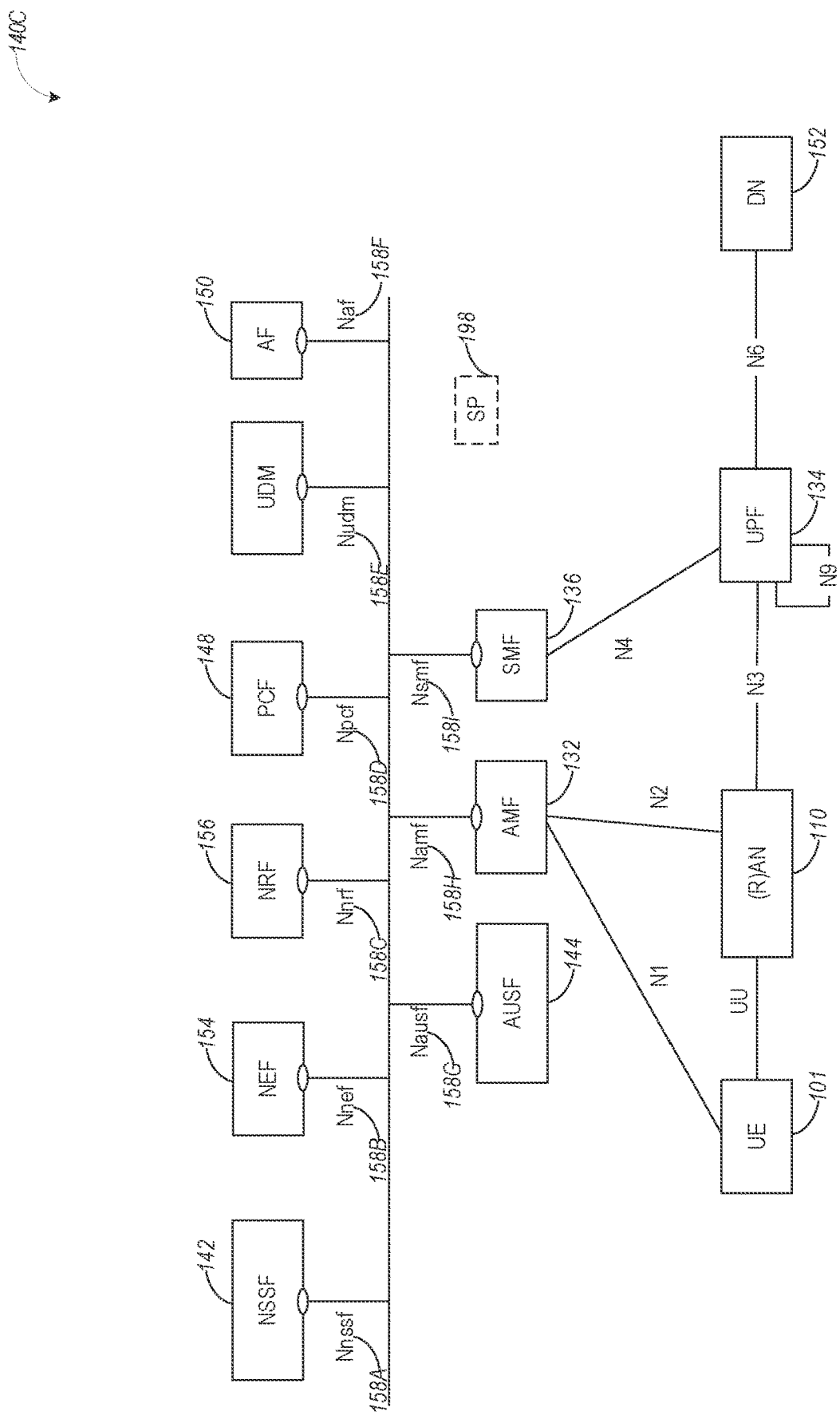

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In example embodiments, any of the UEs or base stations discussed in connection with FIG. 1A-FIG. 1C can be configured to operate using the techniques discussed in connection with FIG. 2 and FIG. 3. The term "base station" is interchangeable with the term "RAN network node."

Disclosed aspects include performance measurements related to UL/DL packet delay for 5G networks under the Rel-16 WI Enhancement of performance assurance for 5G networks including network slicing. The UL/DL packet delay may be measured for QoS flows between UPF and UE, based on mechanisms for QoS Monitoring per QoS Flow per UE to assist URLLC service.

In some aspects, for the UPF to report the end-to-end (between UPF and UE) delay result to the SMF, the NG-RAN may provide the RAN part of the delay between the NG-RAN and the UE (e.g., over the Uu interface) to the UPF. In a split base station (e.g., gNB) architecture with CP/UP separation, such RAN part delay consists of delays that are measured separately across DU, CU-UP, and/or CU-CP as follows:

(a) A DL delay is a sum of delays incurred at CU-UP, on F1-U, at DU, and on the air interface; and (b) An UL delay consists of a PDCP queuing delay in the UE that is reported to CU-CP via RRC, and the rest of the delays are measured by CU-UP and DU.

Figure 2:
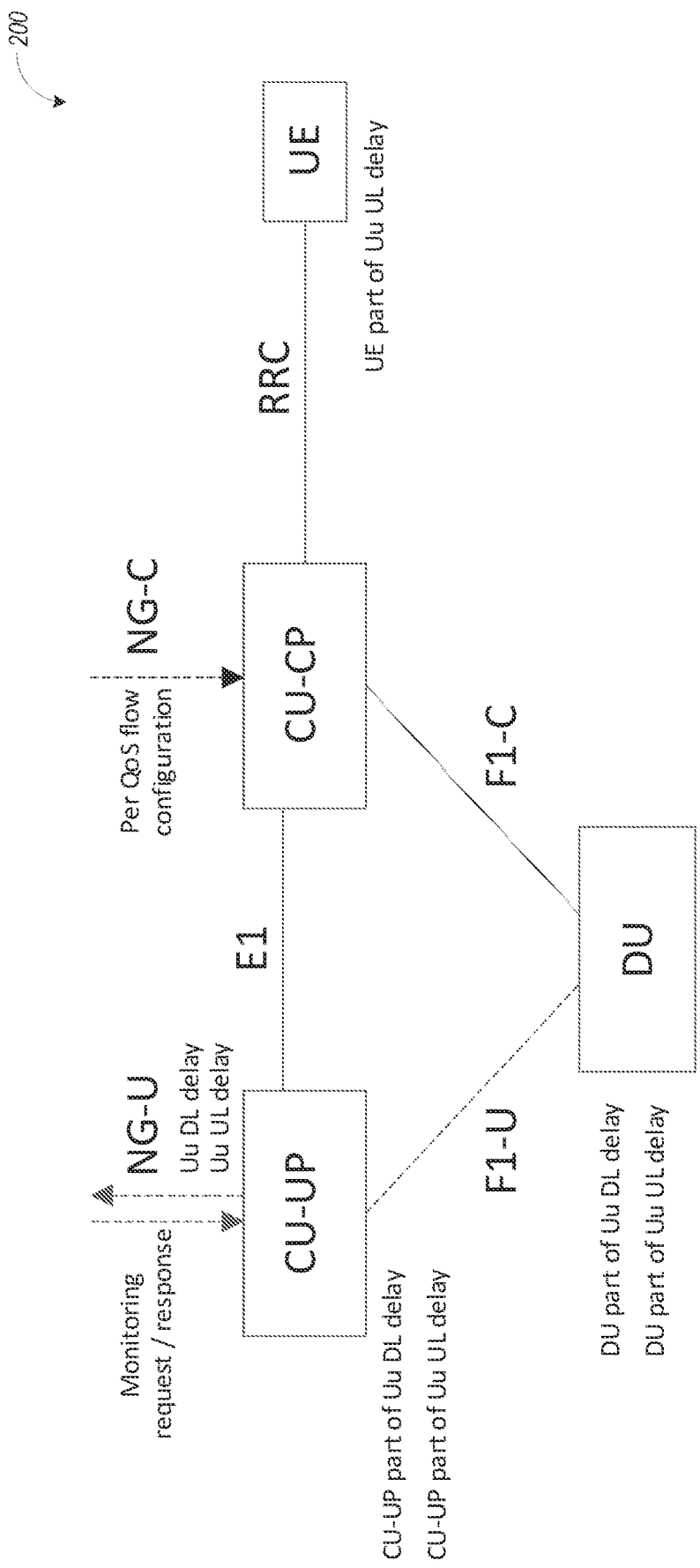
FIG. 2 illustrates delay measurement between the NG-RAN and the UE (for downlink (DL) and uplink (UL)) in a split NG-RAN with CP/UP separation, in accordance with some embodiments.

In general, the communications between the core network a base station, and a UE are illustrated as shown in FIG. 2. FIG. 2 illustrates diagram 200 of delay measurement between the NG-RAN and the UE (for downlink (DL) and uplink (UL)) in a split NG-RAN with CP/UP separation, in accordance with some embodiments.

In some aspects, when CU-UP receives a monitoring request packet, it may report either UL or DL or both delays between the NG-RAN and the UE based on the monitoring configuration for the concerned QoS flow. This means that either CU-UP may be given the delay value to be reported, or at least component delay results which are measured by the DU (for both DL and UL) or by the UE (for UL) may be gathered at the CU-UP. The disclosed techniques support the RAN part of the delay measurement and reporting in a split NG-RAN with CP/UP separation. The disclosed techniques are focused on signaling support for the RAN part delay measurement within an NG-RAN node consisting of DU, CU-UP, and CU-CP, including the UL delay reported from the UE.

In some embodiments, a CU-CP centric approach may be used where all the component results are first gathered at CU-CP and then CU-CP calculates/sends the delay value to be reported (either DL or UL or both) to the CU-UP. Such CU-CP centric approach, however, may not be optimal for the following reasons:

(a) An DL delay is not measured anywhere in the CU-CP nor the UE. Reporting the DU part of DL delay via CU-CP (and eventually to CU-UP) is not necessary; and (b) Such approach unnecessarily involves multi-hop in the case of MR-DC with 5GC. In the example of an MN terminated SCG bearer, the DU part of DL delay should be sent to the SN's CU-CP (over F1-C), then to the MN's CU-CP (over Xn-C), to be aggregated as the delay value to be reported, which is then forwarded to the MN's CU-UP (over E1), which is complicated compared to sending the DU part of DL delay directly to the MN's CU-UP via the already established Xn-U between MN and SN.

The following embodiments are discussed herein:

(a) Embodiment 1: DU reports the DU part of DL/UL delay measurement directly to CU-UP via F1-U or Xn-U. This is an approach letting DU directly report what it has measured (i.e. DU part of DL delay or UL delay) over the already established F1-U or Xn-U to the CU-UP.

(b) Embodiment 2: CU-CP reports the UE part of UL delay measurement directly to CU-UP via E1. This is an approach letting CU-CP directly report what it has (i.e. UE part of UL delay) over E1 to the CU-UP.

(c) Embodiment 3: CU-UP polls delay measurement reporting from DU (DU part of DL/UL delay) via F1-U or Xn-U. Since delays per DRB are measured across different entities, CU-UP may be able to trigger the reporting in case some component result is missing or needs to be updated.

(d) Embodiment 4: CU-UP polls delay measurement reporting from CU-CP (UE part of UL delay) via E1. This is Embodiment 3 applied to CU-CP over E1.

The above embodiments of the present disclosure provide several mechanisms that support the RAN part of the delay measurement and reporting in dual connectivity or a split NG-RAN architecture with CP-UP separation.

Embodiment 1: DU Reports the DU Part of DL/UL Delay Measurement Directly to CU-UP Via F1-U or Xn-U Some example implementation for the stage-3 TS 38.425 is as provided below.

Transfer of MEASUREMENT RESULT frame: The purpose of the Measurement Result procedure is to provide delay measurement information available at the corresponding node to the node hosting the NR PDCP entity. Such information may be taken into consideration by the node hosting the NR PDCP entity for QoS monitoring, as specified in TS 23.501. An NR user plane protocol instance making use of the Transfer of Measurement Result procedure is associated with a single data radio bearer only. The Transfer of Measurement Result procedure may be invoked if the corresponding node decides to send the delay measurement information to the node hosting the NR PDCP entity for the concerned data radio bearer.

The MEASUREMENT RESULT frame may be sent when the corresponding node receives a DL USER DATA PDU including the Measurement Result Polling Flag set to 1. In some aspects, the measurement result may be sent from the corresponding node to the node hosting NR PDCP.

The frame format for the NR user plane protocol—MEASUREMENT RESULT (PDU Type 3): This frame format may be defined to allow the node hosting the NR PDCP entity to receive delay measurement information available at the corresponding node for QoS monitoring. The following TABLE 1 shows the respective MEASUREMENT RESULT frame which can be used in the disclosed techniques.

TABLE 1

| Bits | | | | | | | | Number of Octets |
|---|---|---|---|---|---|---|---|---|
| 7 | 6 | 5 | 4 | 3 | 2 | 1 | 0 | |
| PDU Type (=3) | | | | | UL Measurement Ind. | DL Measurement Ind. | Spare | 1 |
| UL Delay DU Result | | | | | | | | 0 or 4 |
| DL Delay DU Result | | | | | | | | 0 or 4 |
| Padding | | | | | | | | 0–3 |

The coding of information elements in a Measurement Result frame is as follows:

UL Measurement Indication ("Ind.")—Description: This parameter indicates the presence of UL Delay DU Result; Value range: {0=UL Delay DU Result not present, 1=UL Delay DU Result present}; Field length: 1 bit.

UL Delay DU Result—Description: This field indicates the UL delay measured at the corresponding node in milliseconds for the concerned DRB over the Uu interface. It is encoded as an Unsigned32 binary integer value. The node hosting PDCP entity shall, if supported, use this information to calculate the total UL delay over the Uu interface for the concerned DRB and report to the UPF for QoS monitoring; Value range: {0..232-1}; Field length: 4 octets.

DL Measurement Ind.—Description: This parameter indicates the presence of DL Delay DU Result; Value range: {0=DL Delay DU Result not present, 1=DL Delay DU Result present}; Field length: 1 bit.

DL Delay DU Result.—Description: This field indicates DL delay measured at the corresponding node in milliseconds for the concerned DRB over the Uu interface. It is encoded as an Unsigned32 binary integer value. The node hosting PDCP entity shall, if supported, use this information to calculate the total DL delay over the Uu interface for the concerned DRB and report to the UPF for QoS monitoring; Value range: {0..232-1}; Field length: 4 octets.

Embodiment 2: CU-CP Reports the UE Part of UL Delay Measurement Directly to CU-UP Via the E1 Interface An example implementation for the stage-3 TS 38.463 is as provided below.

The Measurement Result procedure: This procedure may be initiated the gNB-CU-CP to report the UL delay measurement result calculated by the UE for the concerned DRBs. The procedure uses UE-associated signaling. The gNB-CU-CP initiates the procedure by sending the MEASUREMENT RESULT message to the gNB-CU-UP.

An example MEASUREMENT RESULT message is illustrated in TABLE 2, which is sent by the gNB-CU-CP to the gNB-CU-UP to provide UL delay measurement calculated by the UE for the concerned DRBs.

TABLE 2

| IE/Group Name | Presence | Range | IE type and reference | Semantics description | Criticalty | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| DRB Measurement Result List | | 1 | | | YES | reject |
| >DRB Measurement Result Item | | 1 ... <maxnoofDRBs> | | | EACH | reject |
| >>DRB ID | M | | 9.3.1.1.6 | | — | |
| >>UL Delay UE Result | M | | INTEGER (0 ... 4294967295) | UL PDCP Queueing Delay in milliseconds measured by the UE for this DRB. | — | |

Embodiment 3: CU-Up Polls Delay Measurement Reporting from DU (DU Part of DL/UL Delay) Via F1-U or Xn-U Interfaces Some example implementation for the stage-3 TS 38.425 is as provided below.

Transfer of DOWNLINK USER DATA. If the Measurement Result Polling Flag is equal to 1, the corresponding node shall if supported, send the MEASUREMENT RESULT to the node hosting the NR PDCP entity.

The frame format for the NR user plane protocol—DL USER DATA (PDU Type 0): The following TABLE 3 shows the respective DL USER DATA frame.

TABLE 3

| | | | Bits | | | | Number of |
|---|---|---|---|---|---|---|---|
| 7 | 6 | 5 | 4 | 3 | 2 | 1 | 0 | Octets |
| PDU Type (=0) | | | Spare | DL Discard Blocks | DL Flush | Report polling | 1 |
| Spare | | | Measurement Result Polling Flag | Report Delivered | User data existence flag | Assistance Info. Report Polling Flag | Retransmission flag | 1 |
| NR-U Sequence Number | | | | | | | | 3 |
| DL discard NR PDCP PDU SN | | | | | | | | 0 or 3 |
| DL discard Number of blocks | | | | | | | | 0 or 1 |
| DL discard NR PDCP PDU SN start (first block) | | | | | | | | 0 or 3 |
| Discarded Block size (first block) | | | | | | | | 0 or 1 |
| . . . | | | | | | | | |
| DL discard NR PDCP PDU SN start (last block) | | | | | | | | 0 or 3 |
| Discarded Block size (last block) | | | | | | | | 0 or 1 |
| DL report NR PDCP PDU SN | | | | | | | | 0 or 3 |
| Padding | | | | | | | | 0-3 |

Coding of Information Elements in Frames.

Measurement Result Polling Flag—Description: This parameter indicates that the node hosting the NR PDCP entity requests the corresponding node to send a MEASUREMENT RESULT PDU; Value range: {0=Measurement Result not requested, 1=Measurement Result requested}; Field length: 1 bit.

Embodiment 4: CU-UP Polls Delay Measurement Reporting from CU-CP (UE Part of UL Delay) Via the E1 Interface Some example implementation for the stage-3 TS 38.463 is as provided below.

The Measurement Result Request procedure: This procedure is initiated by the gNB-CU-UP to request the gNB-CU-CP to provide the UL delay measurement result calculated by the UE for the concerned data resource blocks (DRBs). The procedure uses UE-associated signaling. In some aspects, the gNB-CU-UP initiates the procedure by sending the MEASUREMENT RESULT REQUEST message (e.g., a format of such message is provided in TABLE 4 below) in the gNB-CU-CP.

Figure 3:
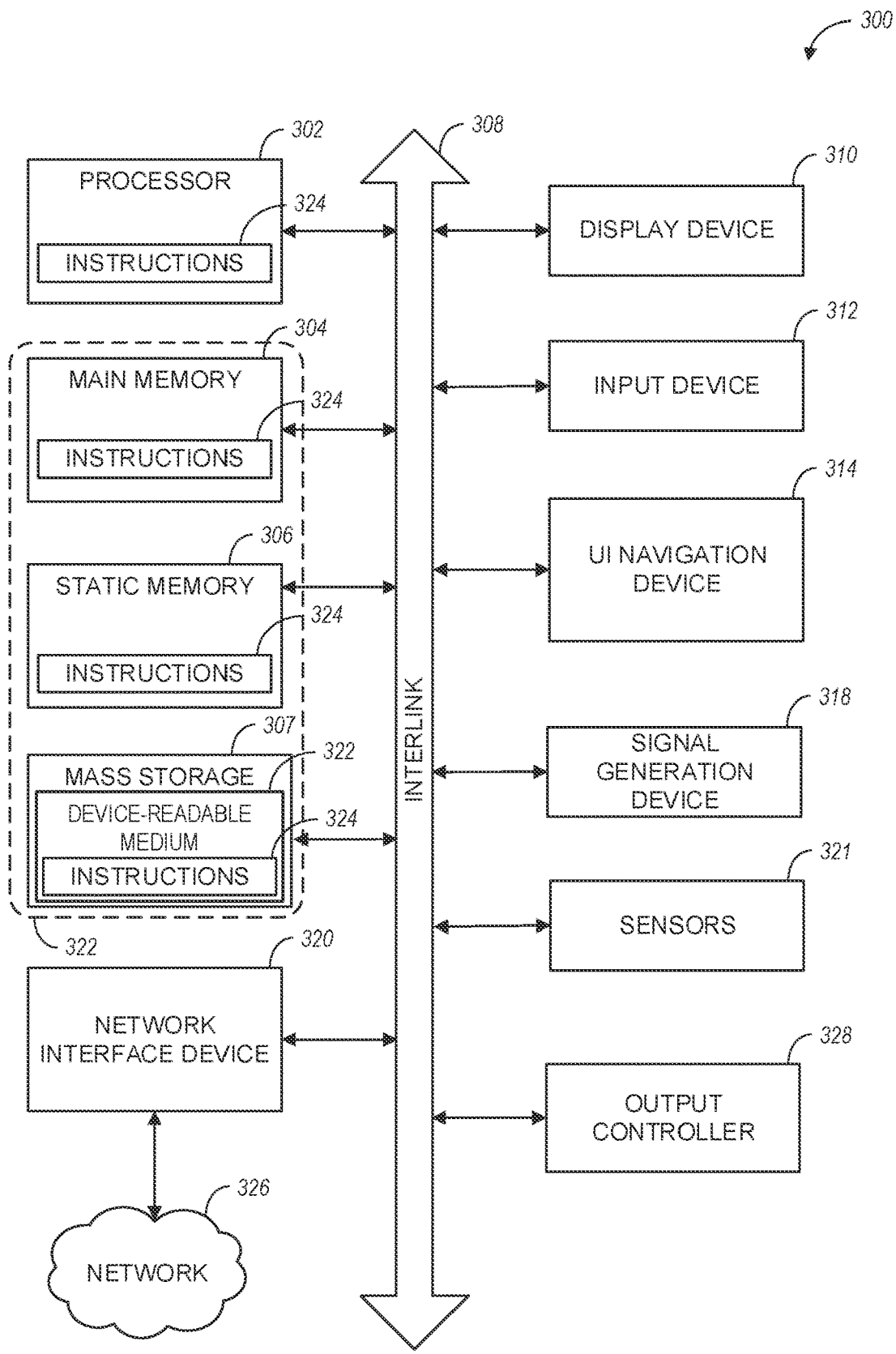
FIG. 3 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 3 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 300 may operate as a standalone device or may be connected (e.g., networked) to other communication devices.

Circuitry (e.g., processing circuitry) is a collection of circuits implemented in tangible entities of the device 300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execu-

TABLE 4

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| DRB Measurement Result Request List | | 1 | | | YES | reject |
| >DRB Measurement Result Request Item | | 1 . . . <maxnoofDRBs> | | | EACH | reject |
| >>DRB ID | M | | 9.3.1.16 | | — | | tion units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 300 follow.

In some aspects, the device 300 may operate as a standalone device or may be connected (e.g., networked) to other devices. In a networked deployment, the communication device 300 may operate in the capacity of a server communication device, a client communication device, or both in server-client network environments. In an example, the communication device 300 may act as a peer communication device in a peer-to-peer (P2P) (or other distributed) network environment. The communication device 300 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 300 may include a hardware processor 302 (e.g., a central processing unit (CPU), a graphics processing unit (GPU), a hardware processor core, or any combination thereof), a main memory 304, a static memory 306, and mass storage 307 (e.g., hard drive, tape drive, flash storage, or other block or storage devices), some or all of which may communicate with each other via an interlink (e.g., bus) 308.

The communication device 300 may further include a display device 310, an alphanumeric input device 312 (e.g., a keyboard), and a user interface (UI) navigation device 314 (e.g., a mouse). In an example, the display device 310, input device 312, and UI navigation device 314 may be a touchscreen display. The communication device 30 may additionally include a signal generation device 318 (e.g., a speaker), a network interface device 320, and one or more sensors 321, such as a global positioning system (GPS) sensor, compass, accelerometer, or another sensor. The communication device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 307 may include a communication device-readable medium 322, on which is stored one or more sets of data structures or instructions 324 (e.g., software) embodying or utilized by any one or more of the techniques or functions described herein. In some aspects, registers of the processor 302, the main memory 304, the static memory 306, and/or the mass storage 307 may be, or include (completely or at least partially), the device-readable medium 322, on which is stored the one or more sets of data structures or instructions 324, embodying or utilized by any one or more of the techniques or functions described herein. In an example, one or any combination of the hardware processor 302, the main memory 304, the static memory 306, or the mass storage 316 may constitute the device-readable medium 322.

As used herein, the term "device-readable medium" is interchangeable with "computer-readable medium" or "machine-readable medium". While the communication device-readable medium 322 is illustrated as a single medium, the term "communication device-readable medium" may include a single medium or multiple media (e.g., a centralized or distributed database, and/or associated caches and servers) configured to store the one or more instructions 324. The term "communication device-readable medium" is inclusive of the terms "machine-readable medium" or "computer-readable medium" and may include any medium that is capable of storing, encoding, or carrying instructions (e.g., instructions 324) for execution by the communication device 300 and that cause the communication device 300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 324 may further be transmitted or received over a communications network 326 using a transmission medium via the network interface device 320 utilizing anyone of a number of transfer protocols. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input-multiple-output (SIMO), MIMO, or multiple-input-single-output (MISO) techniques. In some examples, the network interface device 320 may wirelessly communicate using Multiple User MIMO techniques.

The term "transmission medium" shall be taken to include any intangible medium that is capable of storing, encoding, or carrying instructions for execution by the communication device 300, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a Next Generation Node-B (gNB), the apparatus comprising:
    processing circuitry, wherein to configure the gNB for quality of service (QoS) monitoring in a Next Generation Radio Access Network (NG-RAN) with a control plane (CP)-user plane (UP) separation, the processing circuitry is to:
        decode assistance information data received at a gNB Central Unit (gNB-CU) node of the gNB from a gNB Distributed Unit (gNB-DU) node of the gNB, the gNB-CU node comprising a control plane (gNB-CU-CP) and a user plane (gNB-CU-UP), the gNB-CU node hosting a New Radio Packet Data Convergence Protocol (NR PDCP), the gNB-DU node configured as a corresponding node of the gNB, and the assistance information data including delay information of a communication link of the NG-RAN measured by the corresponding node; and
        determine at the gNB-CU node of the gNB, a delay associated with the communication link of the NG-RAN based on the delay information measured by the corresponding node and further based on additional delay measurements received at the gNB-CU-UP from the gNB-CU-CP, the additional delay measurements associated with the communication link and measured by a user equipment (UE) in communication with the gNB; and
    a memory coupled to the processing circuitry and configured to store the delay information.

2. The apparatus of claim 1, wherein the corresponding node is configured to perform the QoS monitoring to generate QoS monitoring results, the QoS monitoring results comprising the delay information.

3. The apparatus of claim 1, wherein the processing circuitry is to:
    encode an assistance information data frame with the assistance information data for transmission from the corresponding node to the gNB-CU node of the gNB.

4. The apparatus of claim 3, wherein the assistance information data frame includes at least one indicator of the delay information.

5. The apparatus of claim 4, wherein the communication link comprises a downlink (DL) communication link forming a Uu interface between the gNB-DU and a user equipment (UE) in communication with the gNB.

6. The apparatus of claim 5, wherein the delay information comprises a DL delay DU result associated with the DL communication link and measured by the gNB-DU node, and wherein the at least one indicator comprises a DL delay indicator of the DL delay result.

7. The apparatus of claim 4, wherein the communication link comprises an uplink (UL) communication link forming a Uu interface between the gNB-DU node and the UE.

8. The apparatus of claim 7, wherein the delay information comprises an UL delay DU result associated with the UL communication link and measured by the gNB-DU node, and wherein the at least one indicator comprises an UL delay indicator of the UL delay result.

9. The apparatus of claim 1, wherein the communication link is an uplink (UL) communication link between the UE and the gNB, and the processing circuitry is to:
    decode a measurement result message received at the gNB-CU-UP from the gNB-CU-CP, the measurement result message including the additional delay measurements associated with the UL communication link.

10. The apparatus of claim 9, wherein the additional delay measurements are reported by the UE to the gNB-CU-CP.

11. The apparatus of claim 1, further comprising:
    transceiver circuitry coupled to the processing circuitry; and
    one or more antennas coupled to the transceiver circuitry.

12. A non-transitory computer-readable storage medium that stores instructions for execution by one or more processors of a Next Generation Node-B (gNB), the instructions to configure the gNB for quality of service (QoS) monitoring in a Next Generation Radio Access Network (NG-RAN) with a control plane (CP)-user plane (UP) separation, and to cause the gNB to perform operations comprising:
    decoding assistance information data received at an instance of a gNB Central Unit (gNB-CU) node of the gNB from an instance of a gNB Distributed Unit (gNB-DU) node of the gNB, the instance of the gNB-CU node comprising a control plane (gNB-CU-CP) and a user plane (gNB-CU-UP), the instance of the gNB-CU node hosting a New Radio Packet Data Convergence Protocol (NR PDCP), the instance of the gNB-DU node configured as a corresponding node of the gNB, and the assistance information data including delay information of a communication link of the NG-RAN measured by the corresponding node; and determining at the instance of the gNB-CU node of the gNB, a delay associated with the communication link of the NG-RAN based on the delay information measured by the corresponding node and further based on additional delay measurements received at the gNB-CU-UP from the gNB-CU-CP, the additional delay measurements associated with the communication link and measured by a user equipment (UE) in communication with the gNB.

13. The non-transitory computer-readable storage medium of claim 12, wherein the corresponding node is configured to perform the QoS monitoring to generate QoS monitoring results, the QoS monitoring results comprising the delay information.

14. The non-transitory computer-readable storage medium of claim 12, the operations further comprising:
encoding an assistance information data frame with the assistance information data for transmission from the corresponding node to the instance of the gNB-CU node of the gNB.

15. The non-transitory computer-readable storage medium of claim 14, wherein the assistance information data frame includes at least one indicator of the delay information.

16. The non-transitory computer-readable storage medium of claim 15, wherein the communication link comprises a downlink (DL) communication link forming a Uu interface between the instance of the gNB-DU node and the UE.

17. The non-transitory computer-readable storage medium of claim 16, wherein the delay information comprises a DL delay DU result associated with the DL communication link and measured by the instance of the gNB-DU node, and wherein the at least one indicator comprises a DL delay indicator of the DL delay result.

18. The non-transitory computer-readable storage medium of claim 15, wherein the communication link comprises an uplink (UL) communication link forming a Uu interface between the instance of the gNB-DU node and the UE.

19. The non-transitory computer-readable storage medium of claim 18, wherein the delay information comprises an UL delay DU result associated with the UL communication link and measured by the instance of the gNB-DU node, and wherein the at least one indicator comprises an UL delay indicator of the UL delay result.

20. The non-transitory computer-readable storage medium of claim 12, wherein the communication link is an uplink (UL) communication link between the UE and the gNB, and the operations further comprising:
decoding a measurement result message received at the gNB-CU-UP from the gNB-CU-CP, the measurement result message including the additional delay measurements associated with the UL communication link,
wherein the additional delay measurements are reported by the UE to the gNB-CU-CP.

21. A system comprising:
a Next Generation Node-B (gNB) Central Unit (gNB-CU) node;
a gNB Distributed Unit (gNB-DU) node; and
processing circuitry coupled to the gNB-CU node and the gNB-DU node, the processing circuitry to:
decode assistance information data received at the gNB-CU node from the gNB-DU node, the gNB-CU node comprising a control plane (gNB-CU-CP) and a user plane (gNB-CU-UP), the gNB-CU node hosting a New Radio Packet Data Convergence Protocol (NR PDCP), the gNB-DU node configured as a corresponding node, and the assistance information data including delay information of a communication link measured by the corresponding node; and
determine at the gNB-CU node, a delay associated with the communication link based on the delay information measured by the corresponding node and further based on additional delay measurements received at the gNB-CU-UP from the gNB-CU-CP, the additional delay measurements associated with the communication link and measured by a user equipment (UE) in communication with the gNB.

22. The system of claim 21, wherein the communication link is an uplink (UL) communication link between the UE and a gNB, and the processing circuitry is further to:
decode a measurement result message received at the gNB-CU-UP from the gNB-CU-CP, the measurement result message including the additional delay measurements associated with the UL communication link,
wherein the additional delay measurements are reported by the UE to the gNB-CU-CP.

* * * * *